Jan. 13, 1953  O. F. RINGSMITH  2,625,450

ROLLER BEARING

Filed Feb. 20, 1951

OLIVER F. RINGSMITH Inventor

By Francis J. Klempay
Attorney

Patented Jan. 13, 1953

2,625,450

UNITED STATES PATENT OFFICE 2,625,450

ROLLER BEARING

Oliver F. Ringsmith, Newton Falls, Ohio, assignor to The Taylor-Winfield Corporation, Warren, Ohio, a corporation of Ohio Application February 20, 1951, Serial No. 211,884

4 Claims. (Cl. 308—213)

This invention relates to methods of assembling machine parts such as roller bearings and more particularly to applications of this kind wherein permanent assembly of the parts is desired. For this purpose it is common practice to employ electric resistance welding processes wherein the metal pieces to be joined are held in pressure engagement with each other and a heavy electric current passed through the joint whereby the heat resulting from the resistance of the joint is sufficient to bring the adjoining contacting metal up to welding temperature. If large contacting areas are to be joined it is common practice to provide one of the pieces with suitable projections to localize the current flow thereby increasing the current density to assist in the starting and progression of the welding process. While this arrangement is effective in reducing the spattering of scale and metal from the point or points of weld it is nevertheless true that some degree of spattering does take place in substantially all resistance welding. This characteristic has, to some extent, restricted the application of the otherwise desirable resistance welding processes in certain assembly operations.

In the construction of roller bearings, for example, it is recognized that substantial economies and an improved product could be obtained if the final retainer plate or ring of the bearing assembly were projection welded to the outer race. However, this method has not been practical heretofore because the bearing would be ruined by even very minute particles of scale or metal impinging on the load bearing areas of the assembly. My invention overcomes this difficulty by providing an effective means operative, during the resistance welding cycle, to effectively seal the rollers and contiguous race surfaces against the entry of spelter resulting from the welding operation.

Another object of my invention is the provision of an improved arrangement for effectively sealing off resistance welding flash during the assembling of machine parts which does not interfere with the resistance welding process and which does not deter from the quality or usefulness of the finished product.

Other objects and advantages of the invention will become apparent upon full consideration of the following detailed specification and accompanying drawing wherein there is disclosed a certain preferred embodiment of my invention.

Figure 1:
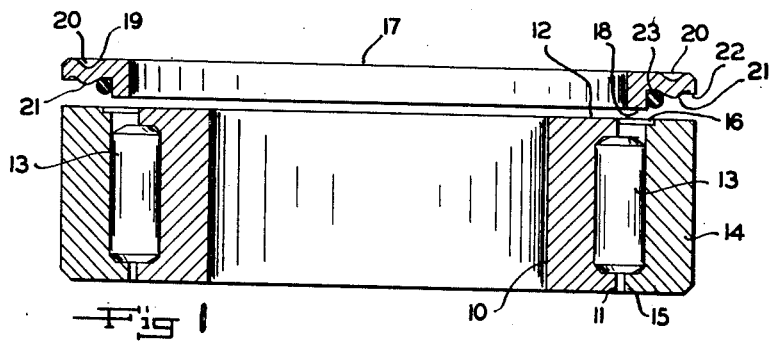
Figure 1 is an axial section of roller bearing parts constructed according to the principles of my invention.

Referring to the drawing, the reference numeral 10 denotes an inner race of a radial type roller bearing which, in accordance with usual practice, is flanged at 11 and 12 to provide a retaining channel for anti-friction rollers 13. An outer race 14 is provided to enclose the rollers 13, and, in the embodiment shown, an inwardly turned retaining lip 15 is provided at one of its edges. At the radially inward corner of the open edge of the outer or unchanneled race 14 I have provided an annular recess 16, the purpose of which will become apparent upon consideration of the remainder of the specification.

In order to permanently retain the above described components in their properly assembled relation I provide a flanged retaining ring 17 which, as shown, has a depending boss 18 which fits loosely inside the inner surface of the outer race 14. It will be noted that the inside diameter of the boss 18 is approximately equal to that of the inwardly turned lip 15, so that, in effect, the assembled unit is quite similar to a desirable known type of bearing which is closed by rolling or die forming.

Figure 2:
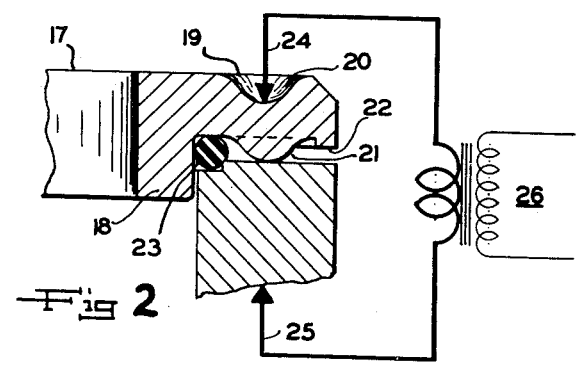
Figure 2 is an enlarged fragmentary section of certain of the bearing parts of Figure 1 showing the retaining ring in position to be resistance welded.

Circumferentially spaced on the relatively thin outwardly extending flange 19 of the retaining ring 17 are a plurality of upset indentations 20 which are pressed into the upper surface of the flange 19 and which deform the said flange at those points to form downwardly depending projections 21. As is shown clearly in Figures 2 and 3, the application of suitable pressure and current between the retaining ring 17 and the outer race 14 will fuse the depending projection 21 into the immediately surrounding area of the outer race 14. In order to supply the necessary electrical pressure I provide a pair of electrodes 24 and 25 which connect the secondary winding of a suitable welding transformer 26, which is in communication with a power source, not shown.

Since it is highly desirable to maintain the axial dimension between the roller retaining faces of lip 15 and boss 18 within a specified tolerance. I provide an annular land 22 which projects downwardly from the bottom face of the flange 19. As may be observed from Figure 3, upon the circumferentially spaced projections 21 becoming plastic, and upon sufficient pressure being applied by the electrodes 24 and 25 to force the retaining ring 17 and outer race 14 into intimate contact, the annular land 22 will insure positive and accurate positioning of the two parts 17 and 14. It is of course necessary to remove the welding current at this time to avoid causing the land 22 to become plastic and deform.

Figure 3:
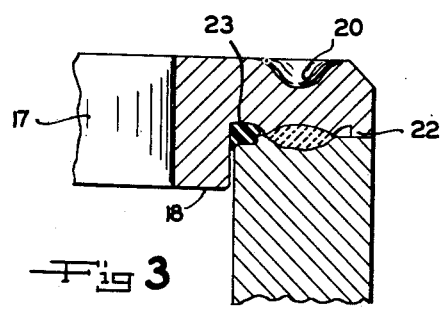
Figure 3 is an enlarged fragmentary section of the bearing of Figure 1 showing the retaining ring as assembled and welded.

As may be understood, it is absolutely essential to prevent the passage of flash particles from the weld into the space between roller races 10 and 14. For this purpose I have provided an O ring 23 which may be of synthetic rubber or other equivalent resilient and non-conducting material. The said O ring 23 is adapted to fit snugly over the outer vertical wall of the boss 18. The ring 23 is partially received in the annular recess 16 when the retaining ring 17 is positioned in readiness for the welding operation. By this means any flash particles which may be emitted during the weld are confined by the O ring and are thus prevented from entering the roller chamber between races 10 and 14. Further, my invention provides that the O ring 23 be substantially compressed during the weld, as shown in Figure 3, so that a positive and permanent seal is effected thereby.

It should further be noted that the O ring 23 is operative to prevent contact between the race 14 and the retaining ring 17 at any point other than that desired, namely at the tips of the projections 21. It is thereby insured that the full welding current will pass through the projections 21 and provide effective welds at those points.

Inasmuch as the sealing ring 23 is highly compressible the same is effective to fully shield the rollers 13 and the surfaces which they contact against any spattering of scale or metal during the whole of the welding operation. The ring simply collapses as the welding progresses. Further, since the collapsed ring is in itself tightly sealed in the recess or pocket provided it can remain entrapped in the assembled structure without danger of disintegrating and entering into the bearing area.

It should now be apparent that I have provided an improved method of assembling machine parts such as roller bearings, for example, which fully accomplishes the objects initially set forth above. The invention consists primarily in the utilization of a deformable sealing ring or barrier to protect highly finished elements of the machine part from flash during resistance welding of the complement elements of the machine part into a unitary assembly. The invention further consists in the provision of certain of these component elements of a recess or pocket wherein the deformed sealing element is permanently housed and even though it does become disintegrated by heat or age its particles are prevented from leaving the recess or pocket and thus contaminating highly finished elements of the assembly.

The invention is of special utility in the fabrication of anti-friction bearings since it enables the retaining ring or plate to be economically yet rigidly and accurately secured to a hardened race by resistance welding whereby high-quality bearings may be produced at substantial less cost than has been heretofore possible.

The principles of the invention are equally applicable, however, in other specific assembling operations as, for example, in the closure of unidirectional clutches and accordingly the herein described application of the principles of the invention should be considered as illustrative only and not in a limiting sense. Reference should therefore be had to the appended claims in determining the scope of the invention.

I claim:

1. In an anti-friction bearing, an inner race member having an outwardly extending flange at each end thereof, said flanges forming a guiding and retaining channel for rolling members, a plurality of rolling members adapted to be rotatably retained and guided by said channel, a ring shaped outer race member having an inwardly extending flange at one end, the open end of said outer race member being adapted to slidably fit over said inner race member and said rolling members in concentric relation thereto; means to retain said races and members in assembled relation comprising a retaining ring having an axially extending annular boss, said boss being adapted to fit slidably into said outer race member to thereby, in cooperation with said inwardly extending flange, form a channel adapted to receive said rolling members, said retaining ring further having an outwardly extending flange welded to the open end of said outer race member, said retaining ring further having an annular land extending from said flange and adapted to contact said outer race member subsequent to the welding operation to thereby positively position said retaining ring and associated boss in predetermined axial relationship with respect to said outer race member; and means to prevent passage of flash particles, emitted during the welding operation, into the said rolling-member-retaining channels, said means including a resilient and non-conductive ring positioned on the periphery of said boss and adapted to have contact with said outer race member during all phases of the welding operation.

2. In an anti-friction bearing, inner and outer race members, one of said members having a flange at each end, said flanges forming a channel for rotatably retaining rolling members, a plurality of rolling members adapted to be retained and guided by said channelled race member in cooperation with said other or unchannelled race member, a retaining ring having an axially extending annular boss, said boss adapted to act in cooperation with said unchannelled race member to provide means of retaining said unchannelled race member against axial movement with respect to said rolling members, a flange extending radially from said retaining ring and welded to an end of said unchannelled race member, means on said flange operative to contact said unchannelled race member subsequent to the welding operation to thereby provide positive axial positioning of the said retaining ring with respect to the said unchannelled race member, and means to prevent flash particles, being emitted from the welding operation, from passing into the confining chamber for said rolling members, said means comprising a resilient and non-conducting ring adapted to be retained on the periphery of said boss and in contact with said unchannelled race member during all stages of the welding operation.

3. In an anti-friction bearing, concentric inner and outer race members one of which has a flange at each axial end to form a channel for rotatably retaining rolling members, a plurality of rolling members retained in said channel, the other of said race members having a flange at one axial end to restrain axial movement of said other race member relative to the said one of said race members in one direction, a retaining ring welded onto the other axial end of said other race member and having an axially extending annular boss engaging said rolling members to thereby restrain axial movement of said other race member in the opposite direction relative to said one of said race members, and a resilient deformable annular ring positioned radially between said annular boss and the other of said race members in compressed condition to seal the annular space occupied by said rolling members from the interstice between the axial end of said other race member and said ring.

4. A bearing according to claim 3 further including an annular recess in the said other of said race members to at least partially receive said compressed resilient ring, said boss being closely fitted with respect to said first mentioned ring whereby particles from said resilient ring are barred from moving into contact with said rolling members.

OLIVER F. RINGSMITH.

REFERENCES CITED

The following references are of record in the file of this patent:

UNITED STATES PATENTS

| Number | Name | Date |
| --- | --- | --- |
| 1,338,939 | Laycock | May 4, 1920 |
| 2,086,985 | Mitchell | July 13, 1937 |
| 2,184,939 | Green | Dec. 26, 1939 |
| 2,360,660 | Eaton et al. | Oct. 17, 1944 |